United States Patent
Samata

(10) Patent No.: US 11,742,712 B2
(45) Date of Patent: Aug. 29, 2023

(54) ROTARY ELECTRIC MACHINE

(71) Applicant: Mitsubishi Electric Corporation, Tokyo (JP)

(72) Inventor: Kohei Samata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/781,744

(22) PCT Filed: Feb. 28, 2020

(86) PCT No.: PCT/JP2020/008259
§ 371 (c)(1),
(2) Date: Jun. 2, 2022

(87) PCT Pub. No.: WO2021/171544
PCT Pub. Date: Sep. 2, 2021

(65) Prior Publication Data
US 2023/0014443 A1    Jan. 19, 2023

(51) Int. Cl.
*H02K 3/51* (2006.01)

(52) U.S. Cl.
CPC ........... *H02K 3/51* (2013.01); *H02K 2203/06* (2013.01)

(58) Field of Classification Search
CPC .. H02K 3/00; H02K 3/12; H02K 3/18; H02K 3/50; H02K 3/505; H02K 3/51; H02K 3/52; H02K 3/522; H02K 3/527
See application file for complete search history.

(56) References Cited

U.S. PATENT DOCUMENTS

| | | | | |
|---|---|---|---|---|
| 4,870,308 | A * | 9/1989 | Sismour, Jr. | H02K 3/51 310/71 |
| 5,111,097 | A * | 5/1992 | Londergan | H02K 15/0006 310/179 |
| 6,930,434 | B1 * | 8/2005 | Spencer | H02K 3/527 310/270 |
| 7,247,966 | B2 * | 7/2007 | Shore | H02K 3/522 310/179 |

FOREIGN PATENT DOCUMENTS

| | | |
|---|---|---|
| JP | 62-104446 A | 5/1987 |
| JP | 62-31577 B2 | 7/1987 |

OTHER PUBLICATIONS

International Search Report and Written Opinion dated May 12, 2020, received for PCT Application PCT/JP2020/008259, Filed on Feb. 28, 2020, 8 pages including English Translation.

* cited by examiner

*Primary Examiner* — Tran N Nguyen
(74) *Attorney, Agent, or Firm* — XSENSUS LLP

(57) ABSTRACT

The present disclosure includes: a holding ring fitted to a rotor and holding a rotor coil of the rotor; and an interpolar jumper wire electrically connecting field poles of the rotor to each other, the interpolar jumper wire being composed of a flexible lead formed by stacking electrically conductive metal plates and a metal wire connected to the flexible lead. In a case where the flexible lead is divided, in terms of positions in a radial direction of the metal plates thereof, at half the number of all the stacked metal plates, an average value of plate thicknesses of metal plates that are disposed on an inner layer side is set to be smaller than an average value of plate thicknesses of metal plates that are disposed on an outer layer side.

6 Claims, 8 Drawing Sheets

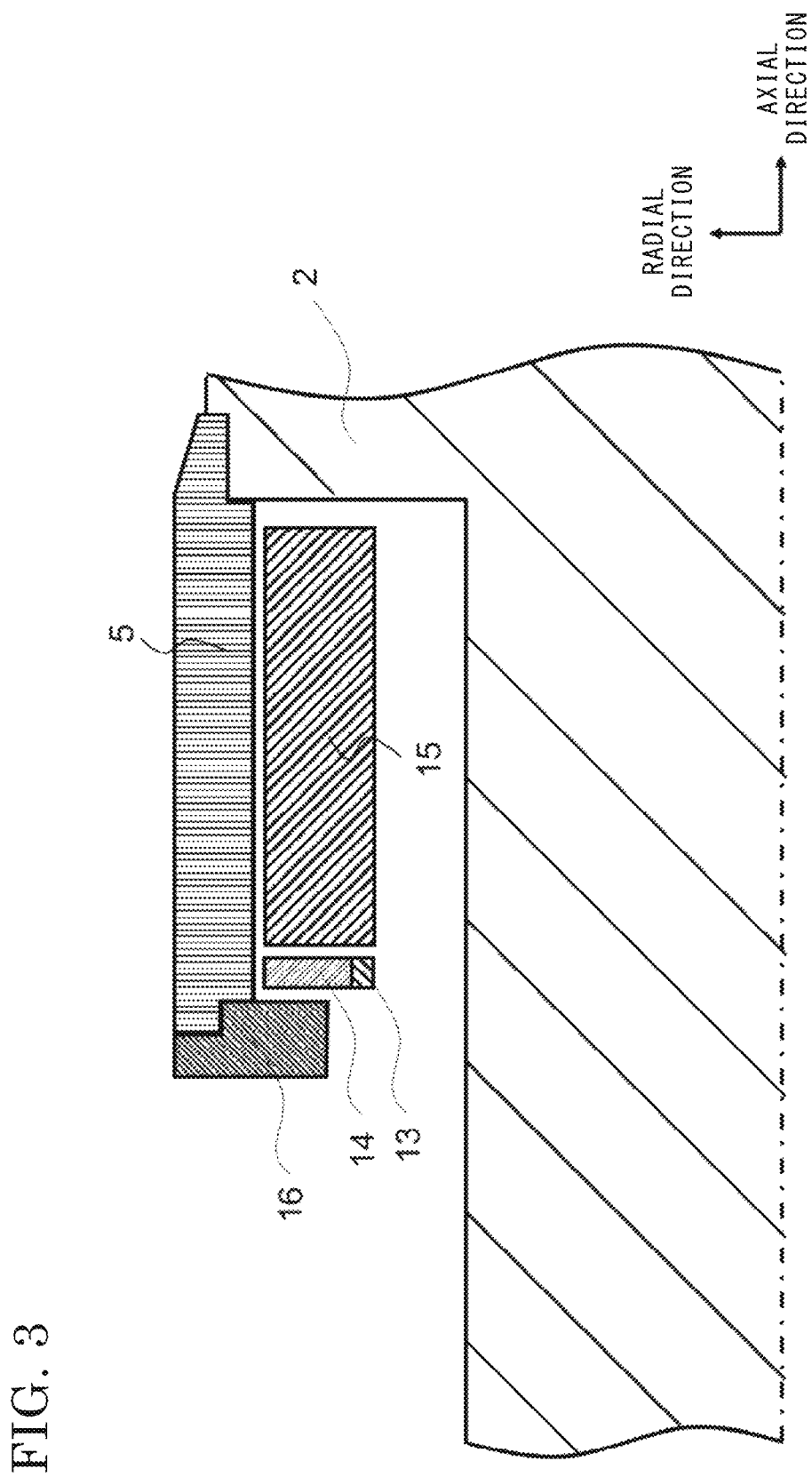

ROTARY ELECTRIC MACHINE

CROSS-REFERENCE TO RELATED APPLICATION

The present application is based on PCT filing PCT/JP2020/008259, filed Feb. 28, 2020, the entire contents of which are incorporated herein by reference.

TECHNICAL FIELD

The present disclosure relates to a rotary electric machine.

BACKGROUND ART

A rotary electric machine such as a turbine electric generator has a rotor and a stator. A field winding is wound on the rotor. If current is caused to flow through the field winding and the rotor is rotated by power of a prime mover, a rotating magnetic field is generated. Consequently, output current is generated in a stator winding. The rotor ordinarily has two or four field poles, and the poles are electrically connected to each other by an interpolar jumper wire attached to a rotor end portion. The interpolar jumper wire has an annular shape and has a flexible lead in an interpolar center portion. The flexible lead has a structure in which a plurality of copper plates having the same thickness and each having a curved shape, are stacked, and the flexible lead is flexible. Both ends of the flexible lead are connected to the interpolar jumper wire by means of brazing. The radially outer side of each of the interpolar jumper wire and the flexible lead is covered by an annular holding ring shrink-fitted to the rotor end portion. An insulation block is interposed between the holding ring and each of the interpolar jumper wire and the flexible lead.

In the above rotary electric machine, the ring radius of the holding ring thereof is increased by centrifugal force during rotation, and the insulation block moves to the radially outer side. In association with this movement, the interpolar jumper wire has an increased ring radius so as to follow the insulation block, and the flexible lead absorbs the expansion in the circumferential direction. Owing to the expansion in the circumferential direction, a bending moment is generated on a center portion of the flexible lead. Owing to the bending moment, bending stresses are generated on a center portion of each layer of the flexible lead so as to cause tension on the radially inner side and compression on the radially outer side. In this case, the bending stresses are intensified in the direction toward an inner layer side on which the curvature is high, and the maximum stress is generated at the center portion of the innermost layer.

If the maximum stress becomes excessive, repetitive activation and stoppage lead to the possibility that fatigue breakage occurs in an extreme case.

In order to prevent occurrence of such a consequence, there has been a conventional rotary electric machine in which a deformation preventing member is in contact with a flexible lead so that a stress to be generated on a center portion of the flexible lead is decreased (Patent Document 1). Further, as another example, there has been a configuration in which a flexible lead is set to have a large length in the radial direction thereof so that a stress to be generated on a center portion of the flexible lead is decreased (Patent Document 2).

CITATION LIST

Patent Document

Patent Document 1: Japanese Laid-Open Patent Publication No. 62-104446 (page 2, lines 37 to 42, FIG. 2)
Patent Document 2: Japanese Published Examined Application No. 62-031577 (page 2, lines 48 to 57, FIG. 8)

SUMMARY OF THE INVENTION

Problems to be Solved by the Invention

In such rotary electric machines, addition of the member or change of the shape of the flexible lead is performed in order to decrease the maximum stress to be generated on the flexible lead. However, this leads to inability to maintain a conventional ventilation path. Consequently, cooling is hindered, and efficiency of electric generation is decreased. In addition, these measures are not applicable to the case where there is a restriction on a space around the flexible lead.

The present disclosure has been made to solve the above drawbacks, and an object of the present disclosure is to improve strength reliability by decreasing the maximum stress to be generated on a flexible lead, while maintaining cooling performance equivalent to that in a conventional configuration without changing a space provided for the flexible lead.

Solution to the Problems

A rotary electric machine according to the present disclosure includes:
a holding ring fitted to a rotor and holding a rotor coil of the rotor; and
an interpolar jumper wire electrically connecting field poles of the rotor to each other, the interpolar jumper wire being composed of
a flexible lead formed by stacking electrically conductive metal plates and
a metal wire connected to the flexible lead, wherein
in a case where the flexible lead is divided in terms of arrangement positions in a radial direction of the metal plates thereof into two sides which are an inner layer side and an outer layer side,
one of the metal plates that is disposed at a center in the radial direction is excluded at the time of the division into the inner layer side and the outer layer side only if the number of all the stacked metal plates is an odd number, and
an average value of plate thicknesses of respective ones of the metal plates that are disposed on the inner layer side is set to be smaller than an average value of plate thicknesses of respective ones of the metal plates that are disposed on the outer layer side.

Effect of the Invention

The rotary electric machine according to the present disclosure makes it possible to realize improvement in the strength reliability by decreasing the maximum stress to be generated on the flexible lead, while maintaining cooling performance equivalent to that in a conventional configuration without changing a space provided for the flexible lead.

BRIEF DESCRIPTION OF THE DRAWINGS

FIG. 3 is an enlarged schematic view of an axial cross section of the rotor end portion in FIGS. 2A and 2B.

DESCRIPTION OF EMBODIMENTS

The present disclosure relates to a rotary electric machine (for example, a turbine electric generator) and relates to a rotary electric machine including an interpolar jumper wire electrically connecting poles of a field winding to each other. Hereinafter, embodiments related to the rotary electric machine will be described with reference to the drawings.

Embodiment 1

Figure 1:
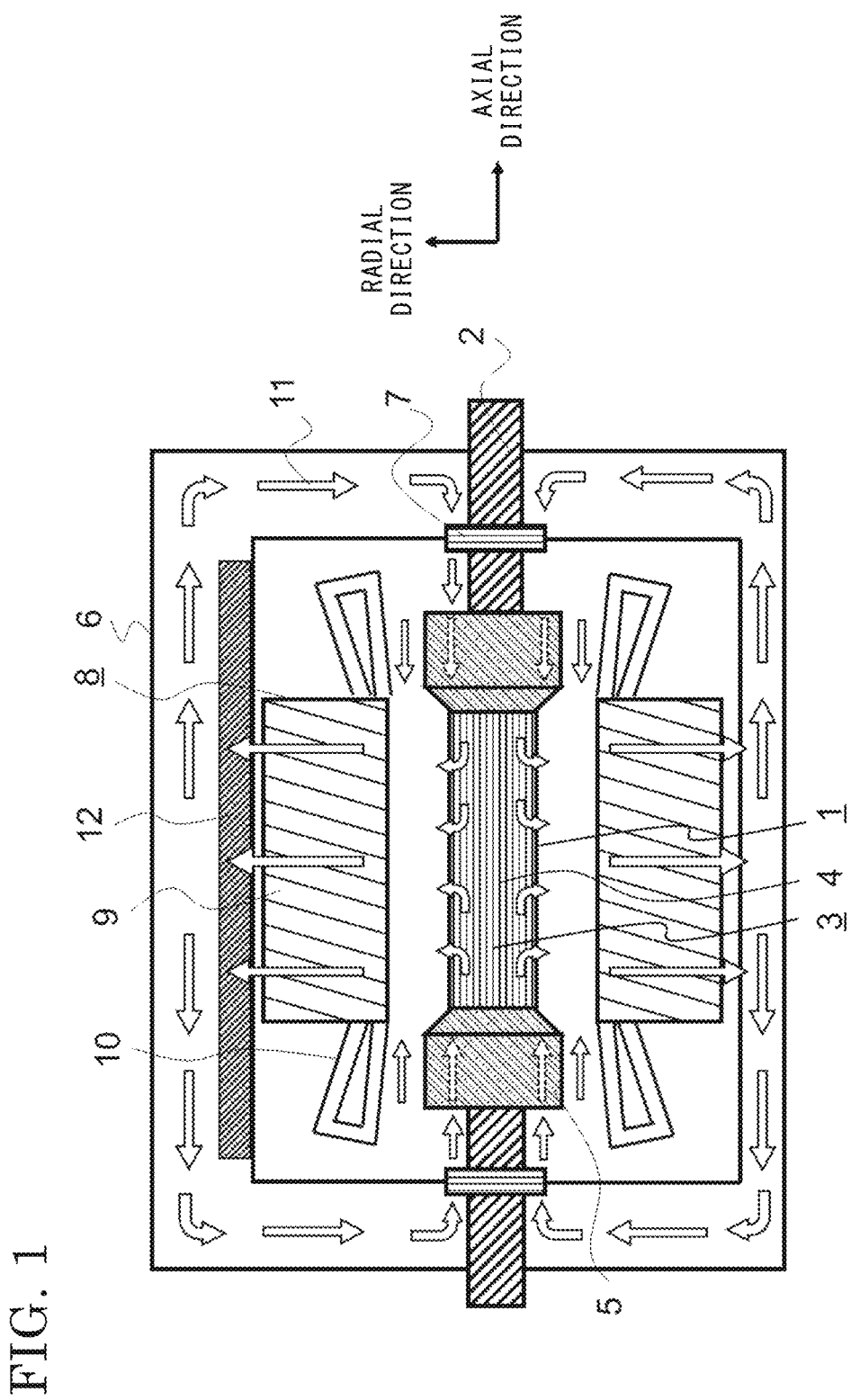
FIG. 1 is a cross-sectional view of an electric generator according to embodiment 1.

FIG. 1 is a cross-sectional view showing the entire configuration of an electric generator according to embodiment 1. In FIG. 1, a rotor 1 includes a rotor shaft 2 and a rotor body 3 provided to the rotor shaft 2. The rotor body 3 includes a rotor core 4, a plurality of rotor coils (not shown), and a pair of holding rings 5. A plurality of rotor slots (not shown) are provided in the rotor core 4. The rotor coils are provided in the rotor slots. The holding rings 5 enclose both end portions of the rotor core 4 and hold the rotor coils.

Here, the rotor 1 turns into an electrical magnet by causing field current to flow through the rotor coils, and is rotated by a prime mover connected to the rotor shaft 2. Consequently, output current flows through a stator coil. By extracting the output current, electric generation is performed.

The rotor shaft 2 is rotatably supported by a frame member 6. A pair of gas-sending fans 7 are provided on the rotor shaft 2. The gas-sending fans 7 are disposed so as to be opposed to the respective holding rings 5 at both end portions in the axial direction of the rotor body 3. The gas-sending fans 7 are rotated integrally with the rotor shaft 2.

Further, a stator 8 is disposed inside the frame member 6. The stator 8 includes a cylindrical stator core 9 and a plurality of stator coils 10 provided on the stator core 9. The stator 8 is disposed so as to enclose the rotor core 4. Here, the inner circumferential surface of the stator 8 is opposed to the outer circumferential surface of the rotor 1.

Cooling gas 11 is sealed in the frame member 6. As the cooling gas 11, for example, hydrogen or air is used. A gas cooler 12 is provided on the radially outer side of the stator 8 in the frame member 6. When the rotor 1 is rotated, the gas-sending fans 7 are rotated so that the cooling gas 11 is circulated in the frame member 6. Consequently, each member inside the frame member 6 is cooled.

In a cooling method of a rotor radial ventilation type shown in FIG. 1, the cooling gas 11 is sent out by the gas-sending fans 7 and passes through the rotor body 3 and the stator 8, to have a high temperature. Thereafter, the cooling gas 11 passes through the gas cooler 12, to have a low temperature. Then, the cooling gas 11 returns to the gas-sending fans 7.

Figure 2B:
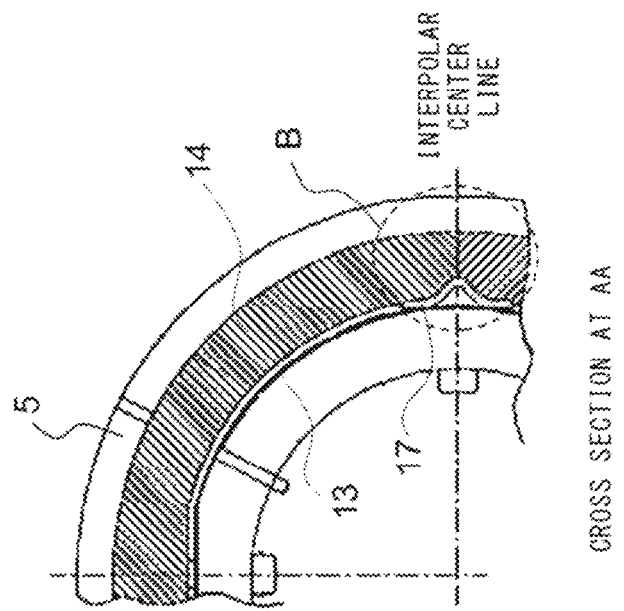
FIGS. 2A and 2B are cross-sectional views each for explaining a structure of a rotor end portion in FIG. 1.
Figure 2A:
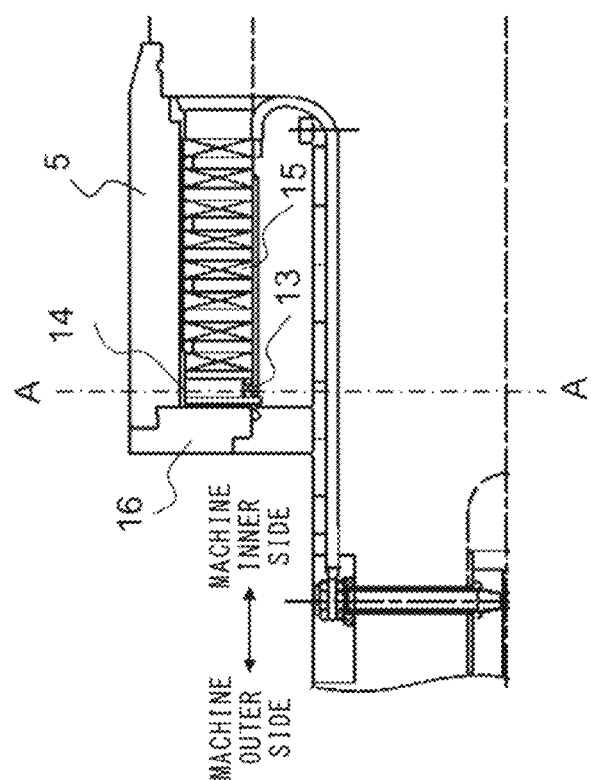

FIG. 2A is a cross-sectional view showing a configuration of a rotor end portion of the electric generator according to embodiment 1. FIG. 2B is a cross-sectional view at AA in FIG. 2A. FIG. 3 is an enlarged schematic view of FIG. 2A. As shown in FIG. 3, a holding ring is shrink-fitted to the rotor shaft 2. As shown in FIG. 2A and FIG. 3, an end ring 16 is internally fitted to a machine-outer-side end portion of the holding ring 5 and prevents deformation of the machine outer side of the holding ring 5. A rotor coil 15, an interpolar jumper wire 13, and an insulation block 14 are disposed on the radially inner side of the holding ring 5. The interpolar jumper wire 13 is attached to a radially-inner-side portion, on the machine outer side, of the holding ring 5 of the rotor end portion. The interpolar jumper wire 13 serves to electrically connect poles of the rotor to each other. The number of poles of the rotor is two or four. The holding ring 5 and the interpolar jumper wire 13 are insulated from each other by the insulation block 14. In the case of a turbine electric generator (hereinafter, briefly referred to simply as an electric generator), the rotor shaft 2 of the electric generator is, at both end portions thereof, respectively connected to the prime mover and an exciter. In this case, the above interpolar jumper wire 13 is provided on the radially inner side of the holding ring 5 of the rotor end portion that is on the exciter side. It is noted that the number of the interpolar jumper wires per electric generator is one, and no interpolar jumper wire is provided on the radially inner side of the holding ring that is on the prime mover side.

Figure 4:
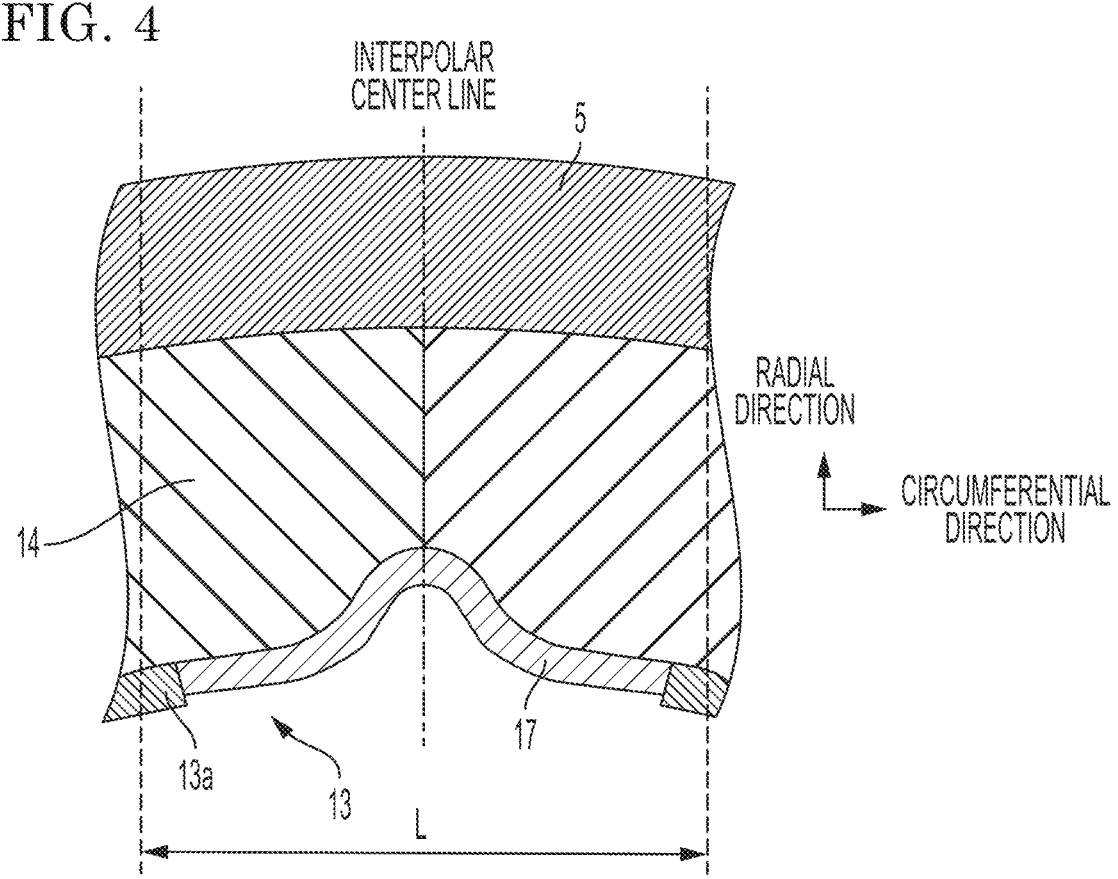
FIG. 4 is an enlarged view of a portion (portion B) of a plane that is perpendicular to the axis of the rotor end portion in FIGS. 2A and 2B.

FIG. 4 is an enlarged cross-sectional view of the rotor end portion in the electric generator according to embodiment 1, as seen in the axial direction thereof. FIG. 4 is an enlarged view of portion B which is enclosed by a broken line and which is a portion in FIG. 2B described above. The interpolar jumper wire 13 has an annular shape. In an interpolar center portion 1a (a region within portion B enclosed by the broken line shown in the above FIG. 2B, the region attaining line-symmetry about an interpolar center line shown in FIG. 4 (a range indicated by a length L and interposed between two dotted lines in FIG. 4), the region including, at both left and right sides thereof across the interpolar center line, parts of metal wires described below) of the rotor, the interpolar jumper wire 13 is disposed on an inner circumferential side close to the rotor shaft and includes a flexible lead 17 and metal wires 13a. As described above, the interpolar jumper wire includes the flexible lead 17 in the interpolar center portion 1a. Thus, the interpolar jumper wire includes the flexible lead at each of two locations on the circumference thereof.

Here, the flexible lead 17 has a structure in which a plurality of copper plates 18 that are each an electrically conductive metal plate having a shape curved so as to protrude to the radially outer side of the rotor, are stacked, and the flexible lead 17 has flexibility. For each copper plate 18, for example, a tough pitch copper material is used. Meanwhile, each metal wire 13a is a single electrically conductive wire made from the same material without having a stacked structure.

It is noted that the material of the above flexible lead is not limited to a copper alloy represented by tough pitch copper and the like, and only has to be an electrically conductive material.

A curved portion of the flexible lead 17 has such a shape as to attain substantial left-right symmetry about the interpolar center line as a symmetry axis (hereinafter, this portion is referred to as a shape center portion 17a and will be described later in detail). Layers of the flexible lead 17 that are adjacent to each other in the radial direction are in contact with each other. At a contact surface therebetween, sliding and separation are allowed. Both end portions of the flexible lead 17 are fixed to the metal wires 13*a* by means of brazing or welding. This is to prevent generation of stress during a manufacturing stage.

Although description has been given above with the flexible lead being present at each of two locations, the flexible lead may be present at one location.

Here, as shown in the drawings, the insulation block 14 is in contact with the radially outer side of each of the metal wires 13*a* and the flexible lead 17 of the interpolar jumper wire. The radially outer side of the insulation block 14 is covered by the annular holding ring 5 shrink-fitted to the rotor end portion. A plurality of the insulation blocks 14 are disposed in the circumferential direction. The ring radius of the above holding ring 5 is increased owing to centrifugal force during rotation. In association with this increase, the plurality of insulation blocks 14 disposed in the circumferential direction between the holding ring 5 and the interpolar jumper wire 13 move to the radially outer side. At this time, the interpolar jumper wire 13 has an increased ring radius so as to follow the radially inner surface of the insulation block 14, but the flexible lead 17 having flexibility absorbs the expansion in the circumferential direction of the metal wires 13*a*.

Figure 5:
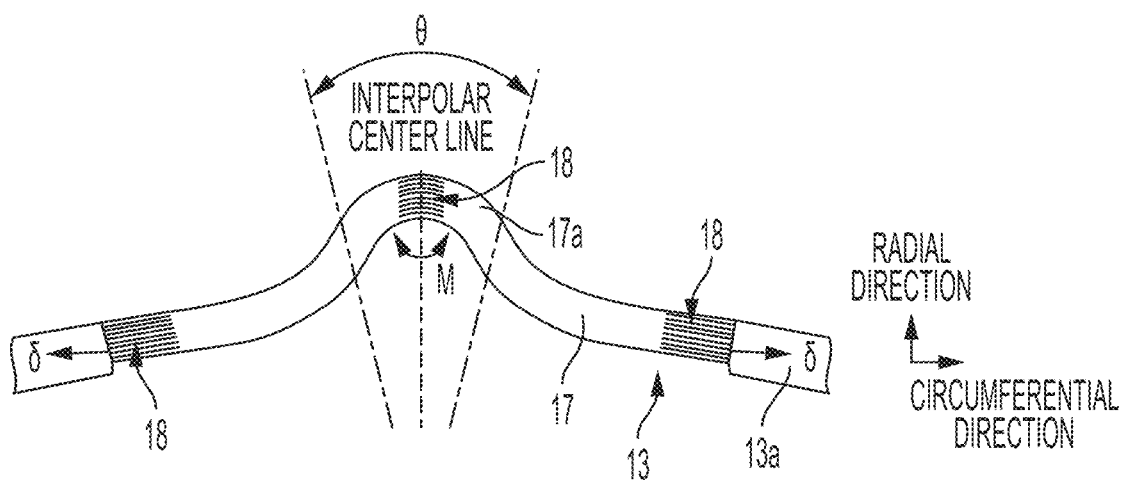
FIG. 5 is a diagram for explaining a deformed state of a flexible lead.

FIG. 5 is a diagram for explaining a deformed state of a flexible lead. If the flexible lead has a structure in which copper plates having plate thicknesses equal to one another are stacked as shown in this drawing, both end portions of the flexible lead are each displaced in the circumferential direction by δ during rotation of the rotor as shown in the drawing. Consequently, a bending moment M is generated on the shape center portion 17*a* (a region indicated by an angle θ and interposed between two alternate-long-and-two-short-dashes lines in the drawing; curvatures of the respective layers are denoted by the same reference character in the region; the curvatures mentioned here each refer to a signed curvature; and the same applies below), of each layer of the flexible lead, which is formed in a protruding shape and which includes the interpolar center line. Owing to this bending moment M, at a top portion (a region that includes the interpolar center line and that is near the interpolar center line; and the same applies below) of each layer of the flexible lead, a bending stress is generated so as to cause tension on the radially inner side and a bending stress is generated so as to cause compression of the radially outer side. A layer that receives the largest stress at the top portion thereof as a result of the bending stresses among all the layers of the flexible lead, is the innermost layer that has the highest curvature.

Figure 6:
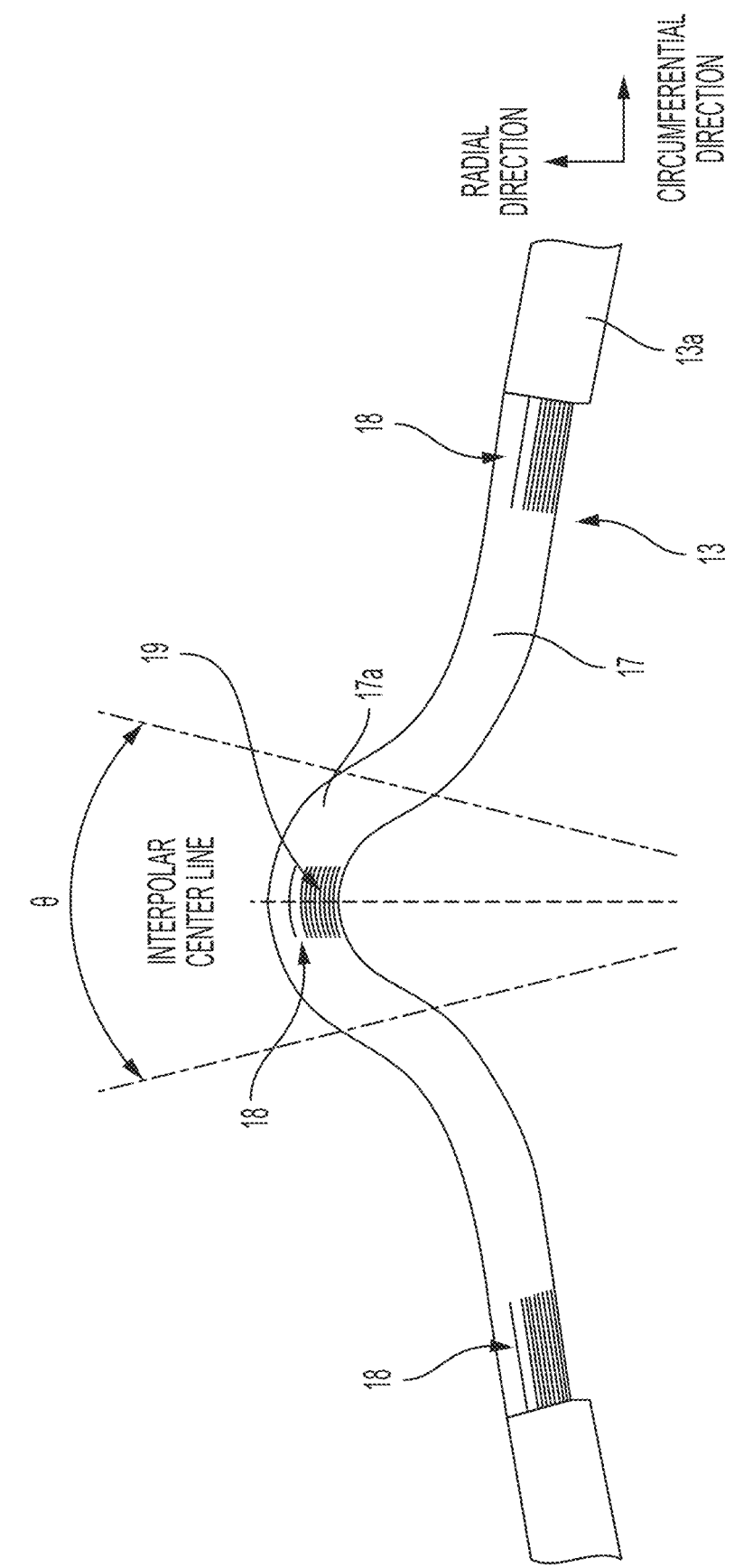
FIG. 6 is a front view of a flexible lead in embodiment 1.

FIG. 6 is a front view showing an example of the configuration of the flexible lead 17 in embodiment 1. In a case where the flexible lead 17 in embodiment 1 is divided at half the number of all the stacked layers into the inner layer side and the outer layer side, an average value of the plate thicknesses of layers on the inner layer side is smaller than an average value of the plate thicknesses of layers on the outer layer side.

It is noted that, if the number of all the stacked layers of the flexible lead is an odd number, a center layer 19 is excluded. Then, layers that are located on the radially inner side relative to the center layer are regarded as layers on the inner layer side, and layers that are located on the radially outer side relative to the center layer are regarded as layers on the outer layer side. Then, the average values of the plate thicknesses of the respective sides of layers are compared with each other. In this case, the number of the layers composing the flexible lead 17 is two or more.

Here, the number of the types of the plate thicknesses of the layers composing the flexible lead 17 is two or more. The plate thickness of the entire flexible lead is even in the circumferential direction. The plate width in the axial direction of the flexible lead 17 is equal to that of a conventional flexible lead, and the conductor cross-sectional area of the flexible lead 17 is also equal to that of the conventional flexible lead. The rotor shaft (not shown) is disposed on the radially inner side of the interpolar jumper wire 13 (composed of the metal wires 13*a* and the flexible lead 17). A gap is present between the interpolar jumper wire 13 and the rotor shaft. Likewise, a gap is present also between the shape center portion of the flexible lead 17 and the rotor shaft. Through the gap between the interpolar jumper wire 13 and the rotor shaft, the cooling gas is sent from the machine outer side toward the machine inner side by means of ventilation fans during operation of the rotary electric machine.

In such an electric generator, the effect of the cooling gas exhibited by ventilation makes it possible to improve strength reliability by decreasing the maximum stress to be generated on the flexible lead as compared to a conventional configuration, while maintaining cooling performance equivalent to that in the conventional configuration without changing a space provided for the flexible lead.

Embodiment 2

Figure 7:
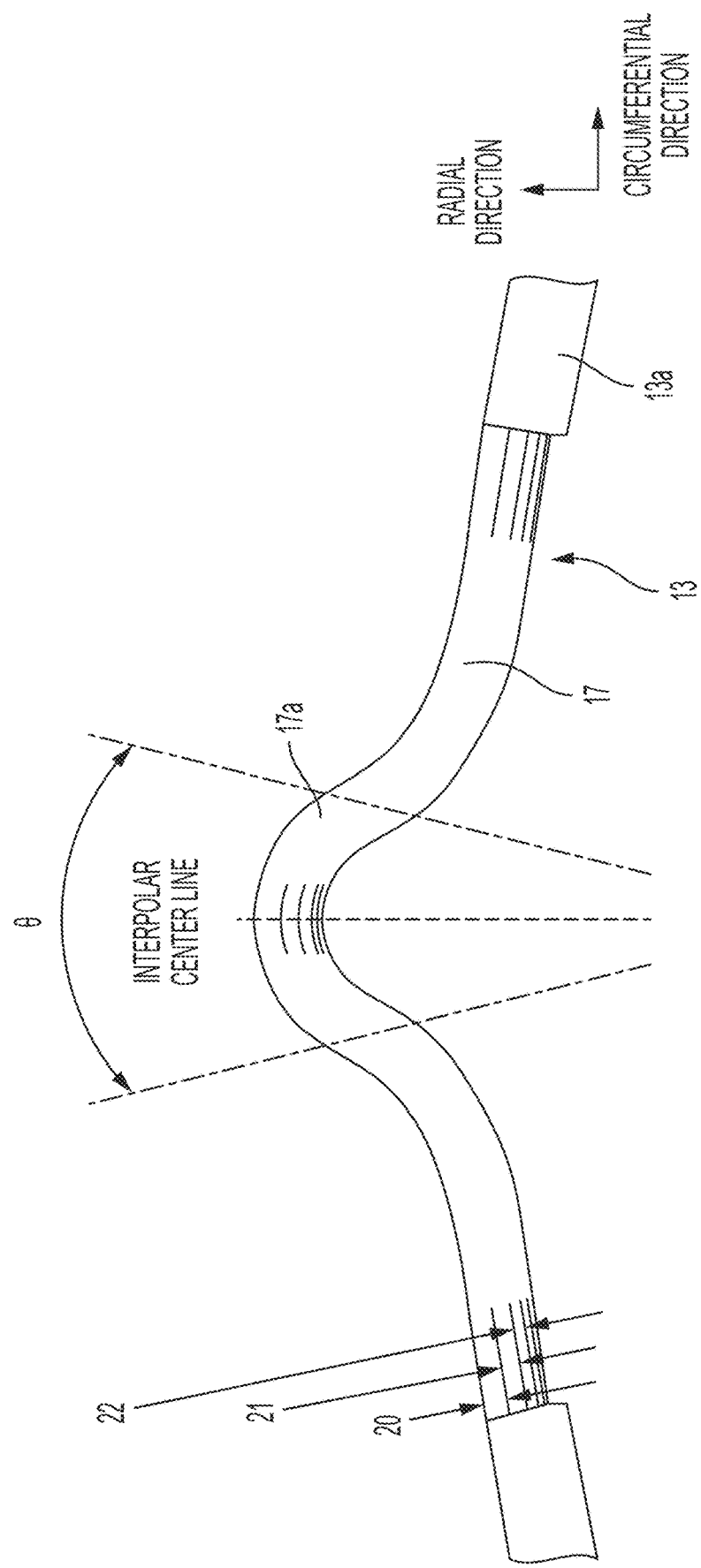
FIG. 7 is a front view of a flexible lead in embodiment 2.

FIG. 7 is a front view showing an example of a configuration of a flexible lead 17 in an electric generator according to embodiment 2. As shown in the drawing, the flexible lead 17 in embodiment 2 has plate thickness 20, 21, and 22 that gradually decrease from the outer layer side toward the inner layer side. Here, the number of the layers composing the flexible lead 17 is two or more. The number of the types of the plate thicknesses of the layers composing the flexible lead 17 is equal to the number of all the stacked layers. The plate thickness of the entire flexible lead is even in the circumferential direction. It is noted that the other components are the same as those in embodiment 1. It is noted that the plate width in the axial direction of the flexible lead 17 is equal to that of a conventional flexible lead, and the conductor cross-sectional area of the flexible lead 17 is also equal to that of the conventional flexible lead.

A gap is present between the interpolar jumper wire 13 and the rotor shaft. Likewise, a gap is present also between the protruding-shape portion of the flexible lead 17 and the rotor shaft. Here, through the gap between the interpolar jumper wire 13 and the rotor shaft, the cooling gas is sent from the machine outer side toward the machine inner side by means of the ventilation fans during operation of the rotary electric machine.

The flexible lead 17 has a structure in which a plurality of copper plates that are each an electrically conductive metal plate having a shape curved so as to protrude to the radially outer side of the rotor, are stacked, and the flexible lead 17 has flexibility. For each copper plate, for example, a tough pitch copper material is used. Meanwhile, the metal wire 13*a* does not have a stacked structure but is a wire in the form of one piece, unlike the flexible lead.

It is noted that the material of the flexible lead 17 is not limited to a copper alloy such as the above tough pitch copper, and only has to be an electrically conductive material. The same applies also to the material of the metal wire.

The flexible lead 17 has, at the shape center portion thereof indicated by the angle θ in the drawing, a shape curved so as to protrude to the radially outer side. The flexible lead 17 attains substantial left-right symmetry about the interpolar center line as a symmetry axis. Here, layers of the flexible lead 17 that are adjacent to each other in the radial direction are in contact with each other. At a contact surface therebetween, sliding and separation are allowed.

Both end portions of the flexible lead 17 are fixed to the metal wires 13a of the interpolar jumper wire 13 by means of brazing or welding. This is to prevent generation of stress during a manufacturing stage.

In such an electric generator, the effect of the cooling gas exhibited by ventilation makes it possible to improve strength reliability by decreasing the maximum stress to be generated on the flexible lead as compared to a conventional configuration, while maintaining cooling performance equivalent to that in the conventional configuration without changing a space provided for the flexible lead.

Embodiment 3

Figure 8:
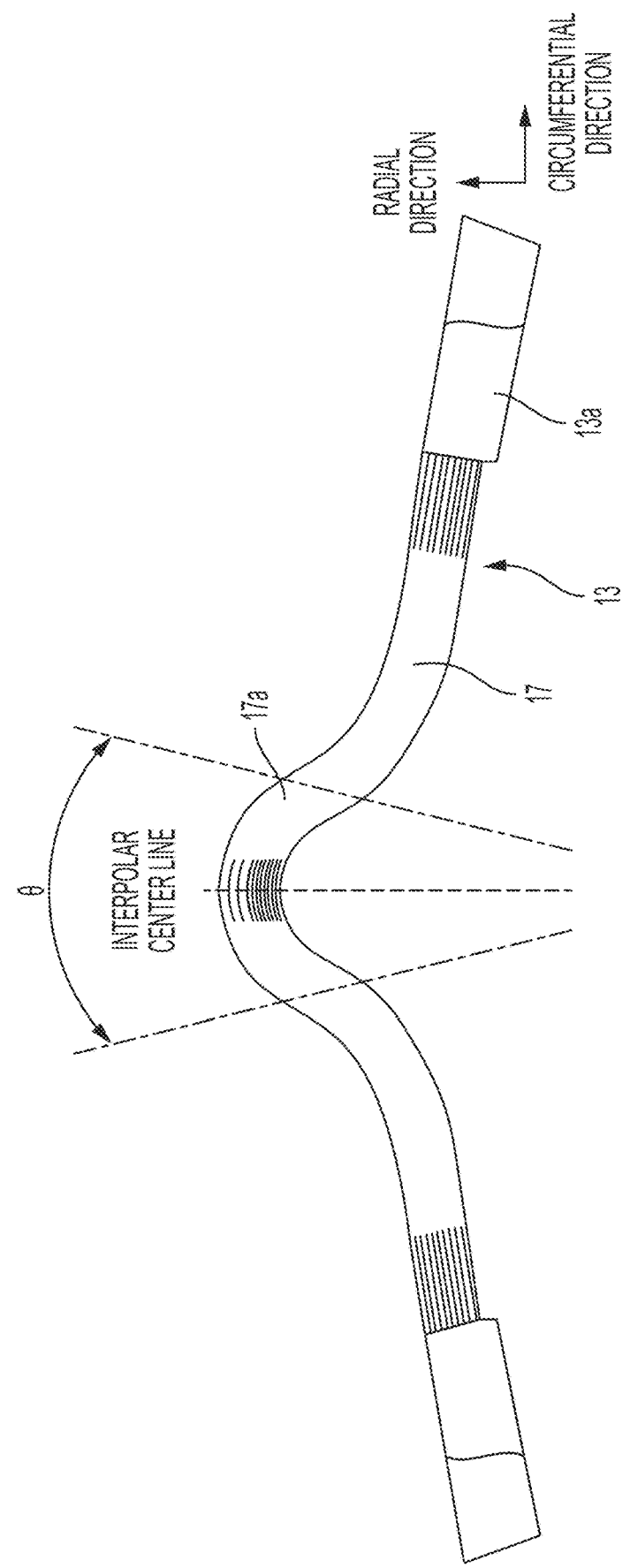
FIG. 8 is a front view of a flexible lead in embodiment 3.

FIG. 8 is a front view showing a configuration of a flexible lead 17 in an electric generator according to embodiment 3. In a case where the flexible lead 17 in embodiment 3 is divided at half the number of all the stacked layers into the inner layer side and the outer layer side, the flexible lead 17 has, at the shape center portion 17a thereof, a region in which the average value of the plate thicknesses of layers on the inner layer side is smaller than the average value of the plate thicknesses of layers on the outer layer side. For example, the top portion including the interpolar center line corresponds to the region.

It is noted that, if the number of all the stacked layers of the flexible lead is an odd number, a center layer is excluded. Then, layers that are located on the radially inner side relative to the center layer are regarded as layers on the inner layer side, and layers that are located on the radially outer side relative to the center layer are regarded as layers on the outer layer side. Then, the average values of the plate thicknesses on the respective sides of layers are compared with each other. In this case, copper plates having plate thicknesses equal to one another are stacked at the portion other than the shape center portion 17a. Here, the plate thickness of each metal plate at the shape center portion of the flexible lead is continuously changed from the interpolar center line toward end portions which are peripheral portions (of the shape center portion).

The flexible lead 17 has a shape that attains substantial left-right symmetry about the interpolar center line as a symmetry axis. The number of the layers composing the flexible lead 17 is two or more. The number of the types of the plate thicknesses, at the top portion, of the respective layers of the flexible lead 17 is two or more. It is noted that the plate thickness of the entire flexible lead is even in the circumferential direction. The other components are the same as those in embodiment 1. The plate width in the axial direction of the flexible lead 17 is equal to that of a conventional flexible lead, and the conductor cross-sectional area of the flexible lead 17 is also equal to that of the conventional flexible lead.

In the electric generator according to the present embodiment as well, a gap is present between the interpolar jumper wire 13 and the rotor shaft (not shown). Likewise, a gap is present also between the shape center portion 17a of the flexible lead 17 and the rotor shaft. Here, through the gap between the interpolar jumper wire 13 and the rotor shaft, the cooling gas is sent from the machine outer side toward the machine inner side by means of the ventilation fans during operation of the rotary electric machine.

Here as well, the flexible lead 17 has a structure in which a plurality of copper plates that are each an electrically conductive metal plate having a shape curved so as to protrude to the radially outer side of the rotor, are stacked, and the flexible lead 17 has flexibility. For each copper plate, for example, a tough pitch copper material is used. The flexible lead is connected at each peripheral portion thereof to the corresponding metal wire which does not have a stacked structure but which is a single (thick) wire. Both the flexible lead and the metal wire compose the interpolar jumper wire 13.

It is noted that structures, components, and materials in the flexible lead in embodiment 3 other than those described above are the same as those in embodiment 1 or embodiment 2, and thus description thereof will be omitted here.

In the electric generator configured as described above as well, the effect of the cooling gas exhibited by ventilation makes it possible to improve strength reliability by decreasing the maximum stress to be generated on the flexible lead as compared to a conventional configuration, while maintaining cooling performance equivalent to that in the conventional configuration without changing a space provided for the flexible lead.

Embodiment 4

Figure 9:
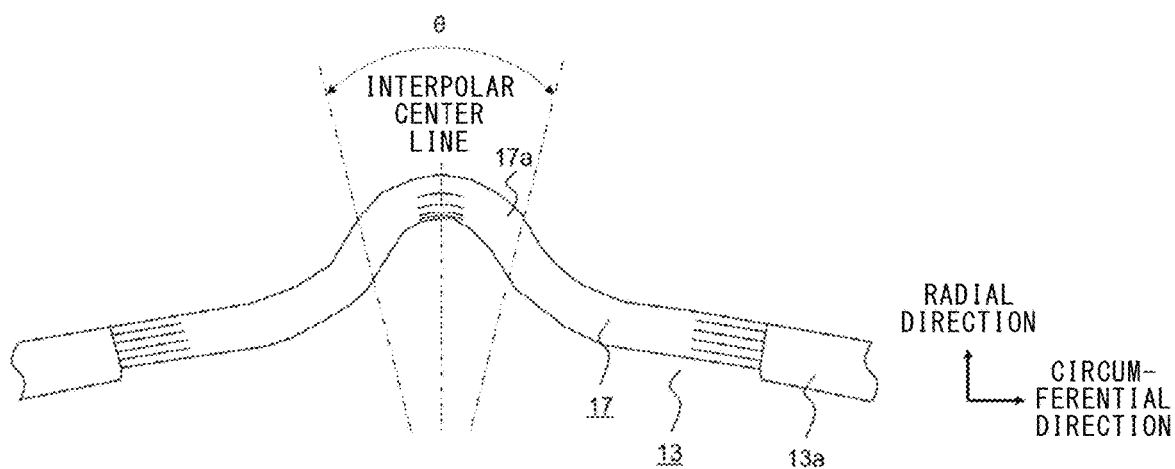
FIG. 9 is a front view of a flexible lead in embodiment 4.

FIG. 9 is a front view showing a configuration of a flexible lead 17 in an electric generator according to embodiment 4. The flexible lead 17 in embodiment 4 has, at the top portion of the shape center portion curved in a protruding shape, a plate thickness that gradually decreases from the outer layer side toward the inner layer side. Copper plates having plate thicknesses equal to one another are stacked at the portion other than the shape center portion of the flexible lead 17. The plate thickness of each layer of the flexible lead 17 is continuously changed from the top portion curved in a protruding shape, toward the ends of the shape center portion. Here, the number of the layers composing the flexible lead 17 is two or more. The number of the types of the plate thicknesses, at the top portion, of each layer of the flexible lead 17 is equal to the number of all the stacked layers. It is noted that the plate thickness of the entire flexible lead is even in the circumferential direction. The other components are the same as those in embodiment 1. The plate width in the axial direction of the flexible lead 17 is equal to that of a conventional flexible lead, and the conductor cross-sectional area of the flexible lead 17 is also equal to that of the conventional flexible lead.

A gap is present between the interpolar jumper wire 13 and the rotor shaft (not shown). Likewise, a gap is present also between the shape center portion 17a of the flexible lead 17 and the rotor shaft. Through the gap between the interpolar jumper wire 13 and the rotor shaft, the cooling gas is sent from the machine outer side toward the machine inner side by means of the ventilation fans during operation of the rotary electric machine.

Layers of the flexible lead 17 that are adjacent to each other in the radial direction are in contact with each other. At a contact surface therebetween, sliding and separation are allowed. Both end portions of the flexible lead 17 are fixed to the interpolar jumper wire 13 by means of brazing or welding. This is to prevent generation of stress during a manufacturing stage.

In the electric generator according to the present embodiment, structures and materials of the flexible lead 17 other than those described above are the same as those in the other embodiments.

In the electric generator configured as described above as well, the effect of the cooling gas exhibited by ventilation makes it possible to improve strength reliability by decreasing the maximum stress to be generated on the flexible lead as compared to a conventional configuration, while maintaining cooling performance equivalent to that in the conventional configuration without changing a space provided for the flexible lead.

Here, in the above embodiments, a larger number of the copper plates composing the flexible lead, leads to a larger surface area, in which heat transfer to and from the cooling gas occurs, per conductor cross-sectional area in which current flows. Thus, heat generation from the flexible lead is decreased. Therefore, decrease in tensile strength and fatigue strength of materials due to temperature rise are suppressed, whereby strength reliability is improved.

In addition, a layer having the smallest plate thickness in the flexible lead described in each of the above embodiments, at least has a plate thickness at which the layer does not buckle owing to its own weight or centrifugal force.

Although the rotary electric machine has been described while being exemplified by a turbine electric generator in the above examples, the present disclosure is applicable also to other electric generators and electric motors.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent parts may be modified, added, or eliminated. At least one of the constituent parts mentioned in at least one of the preferred embodiments may be selected and combined with the constituent parts mentioned in another preferred embodiment.

DESCRIPTION OF THE REFERENCE CHARACTERS 1 rotor
1a interpolar center portion
2 rotor shaft
3 rotor body
4 rotor core
5 holding ring
6 frame member
7 gas-sending fan
8 stator
9 stator core
10 stator coil
11 cooling gas
12 gas cooler
13 interpolar jumper wire
13a metal wire
14 insulation block
15 rotor coil
16 end ring
17 flexible lead
17a shape center portion

The invention claimed is:

1. A rotary electric machine comprising:
a holding ring fitted to a rotor and holding a rotor coil of the rotor; and
an interpolar jumper wire electrically connecting field poles of the rotor to each other, the interpolar jumper wire being composed of
a flexible lead formed by stacking electrically conductive metal plates and
a metal wire connected to the flexible lead, wherein
in a case where the flexible lead is divided in terms of arrangement positions in a radial direction of the metal plates thereof into two sides which are an inner layer side and an outer layer side,
one of the metal plates that is disposed at a center in the radial direction is excluded at the time of the division into the inner layer side and the outer layer side only if the number of all the stacked metal plates is an odd number, and
an average value of plate thicknesses of respective ones of the metal plates that are disposed on the inner layer side is set to be smaller than an average value of plate thicknesses of respective ones of the metal plates that are disposed on the outer layer side.

2. The rotary electric machine according to claim 1, wherein
the flexible lead has a plate thickness that gradually decreases from the outer layer side toward the inner layer side.

3. The rotary electric machine according to claim 1, wherein
the flexible lead is configured such that
a plate thickness of the entire flexible lead is, at each position thereof in a circumferential direction, the same in an axial direction, and
at a shape center portion which is a center region including an interpolar center line between the field poles of the rotor,
the flexible lead has a shape protruding to an outer circumferential side, and
the flexible lead has a region in which the plate thickness gradually decreases from the outer layer side toward the inner layer side, and a region in which a plate thickness of each of the stacked metal plates is continuously changed in the circumferential direction.

4. The rotary electric machine according to claim 3, wherein the plate thickness of the metal plate is set to be even at a portion other than the shape center portion.

5. The rotary electric machine according to claim 2, wherein
the flexible lead is configured such that
a plate thickness of the entire flexible lead is, at each position thereof in a circumferential direction, the same in an axial direction, and
at a shape center portion which is a center region including an interpolar center line between the field poles of the rotor,
the flexible lead has a shape protruding to an outer circumferential side, and
the flexible lead has a region in which the plate thickness gradually decreases from the outer layer side toward the inner layer side, and a region in which a plate thickness of each of the stacked metal plates is continuously changed in the circumferential direction.

6. The rotary electric machine according to claim 5, wherein the plate thickness of the metal plate is set to be even at a portion other than the shape center portion.

* * * * *